United States Patent

Noguchi et al.

Patent Number: 5,115,896
Date of Patent: May 26, 1992

[54] CONTROL SYSTEM FOR VEHICLE PROVIDED WITH AUTOMATIC TRANSMISSION

[75] Inventors: Naoyuki Noguchi; Kazuki Murakami; Eiji Kanehisa; Seiji Makimoto, all of Hiroshima, Japan

[73] Assignee: Mazda Motor Corporation, Hiroshima, Japan

[21] Appl. No.: 660,627

[22] Filed: Feb. 27, 1991

[30] Foreign Application Priority Data

Feb. 27, 1990 [JP] Japan ............................. 2-48147

[51] Int. Cl.$^5$ .................................... F16D 43/22
[52] U.S. Cl. ........................... 192/0.052; 192/0.033; 192/0.076; 192/3.31
[58] Field of Search ............... 192/0.052, 0.033, 0.092, 192/3.31, 0.096, 0.076

[56] References Cited

U.S. PATENT DOCUMENTS

| | | | |
|---|---|---|---|
| 4,373,619 | 2/1983 | Schritt et al. | 192/0.052 X |
| 4,618,041 | 10/1986 | Sotoyama et al. | 192/0.052 X |
| 4,640,394 | 2/1987 | Higashi et al. | 192/3.31 X |
| 4,730,708 | 3/1988 | Hamano et al. | 192/0.076 X |
| 4,783,743 | 11/1988 | Yashiki et al. | 192/0.052 X |
| 4,940,122 | 7/1990 | Fujieda | 192/3.31 |
| 4,953,679 | 9/1990 | Okino. | |
| 4,957,194 | 9/1990 | Sawa et al. | |

FOREIGN PATENT DOCUMENTS 60-1464 1/1985 Japan.

*Primary Examiner*—Leslie A. Braun
*Assistant Examiner*—Andrea Pitts
*Attorney, Agent, or Firm*—Sixbey, Friedman, Leedom & Ferguson

[57] ABSTRACT

A vehicle is provided with an engine and an automatic transmission having a lockup mechanism which engages and disengages to directly connect and disconnect input and output shafts of a torque converter of the automatic transmission to and from each other. A control system for such a vehicle has a deceleration detecting circuit which detects that the engine is decelerating based on the engine speed and a throttle opening, and a lockup mechanism control circuit which causes the lockup mechanism to engage when the engine is decelerating and permits the same to disengage when the deceleration of the engine finishes. The control system inhibits the lockup mechanism control circuit from causing the lockup mechanism to disengage in a period in which the engine speed can temporarily fall because of the automatic transmission's shifting into neutral in the process of a downshift.

4 Claims, 5 Drawing Sheets

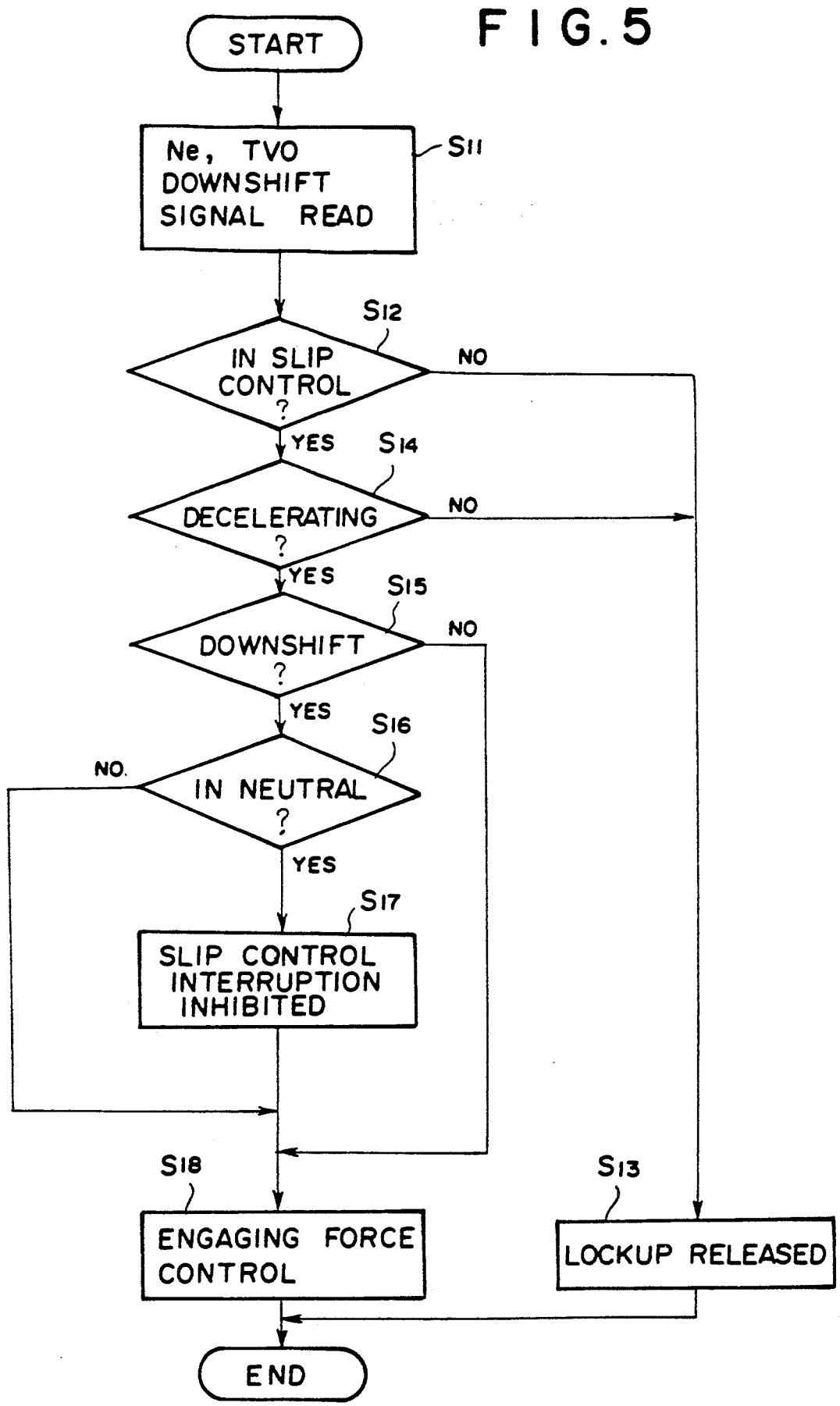

1

CONTROL SYSTEM FOR VEHICLE PROVIDED WITH AUTOMATIC TRANSMISSION

BACKGROUND OF THE INVENTION

1. Field of the Invention

This invention relates to a control system for a vehicle provided with an automatic transmission having a lockup mechanism.

2. Description of the Prior Art

As disclosed, for instance, in Japanese Unexamined Patent Publication No. 60(1985)-1464, there has been known a control system for a vehicle provided with an automatic transmission having a lockup mechanism in which fuel to be supplied to the engine is cut and at the same time the lockup mechanism is caused to engage with a controlled engaging force when the engine is being decelerated, and the lockup mechanism is subsequently caused to disengage when the deceleration of the engine finishes and fuel supply to the engine is resumed so that fluctuation in the engine torque generated upon resumption of fuel supply is absorbed by the torque converter and the torque shock generated due to the fluctuation in the engine torque is suppressed.

However it has been found that, if the automatic transmission downshifts during deceleration of the engine, the conventional control system can determine that deceleration of the engine has finished though the engine is still decelerating since the automatic transmission once shifts to neutral before shifting to the target gear speed and the engine speed temporarily falls by a large amount while the automatic transmission is in neutral. As a result, the lockup mechanism is caused to disengage though the engine is still decelerating and even if the engine speed is increased again in response to completion of the downshift, the lockup mechanism cannot be engaged again before the deceleration of the engine finishes since it takes a certain time to establish a control hydraulic pressure necessary for causing the lockup mechanism to engage.

SUMMARY OF THE INVENTION

In view of the foregoing observations and description, the primary object of the present invention is to provide a control system for a vehicle provided with an automatic transmission having a lockup mechanism in which the lockup mechanism can be surely kept engaged during deceleration of the engine without being misled by temporary fall in the engine speed due to downshift of the automatic transmission.

In accordance with the present invention, there is provided a control system for a vehicle provided with an engine and an automatic transmission having a lockup mechanism which engages and disengages to directly connect and disconnect input and output shafts of a torque converter of the automatic transmission to and from each other, the control system comprising a deceleration detecting means which detects that the engine is decelerating based on the engine speed as detected by an engine speed sensor and a throttle opening as detected by a throttle opening sensor, and a lockup mechanism control means which causes the lockup mechanism to engage when the engine is decelerating and permits the same to disengage when the deceleration of the engine finishes, wherein the improvement comprises:

a downshift detecting means which detects that a downshift of the automatic transmission begins to take place, and a lockup release inhibiting means which receives the output of the downshift detecting means and inhibits the lockup mechanism control means from causing the lockup mechanism to disengage in a period in which the engine speed can temporarily fall because of the automatic transmission's shifting into neutral in the process of a downshift detected by the downshift detecting means.

With this arrangement, the lockup mechanism can be surely kept engaged during deceleration of the engine without being misled by temporary fall in the engine speed due to downshift of the automatic transmission, whereby fuel cut is continued long during deceleration and the fuel economy is improved, and at the same time, engine brake effect can be effectively obtained and the running stability during deceleration can be improved.

BRIEF DESCRIPTION OF THE DRAWINGS

FIG. 5 is an alternate embodiment of the flow chart of FIG. 3.

DESCRIPTION OF THE PREFERRED EMBODIMENT

Figure 1:
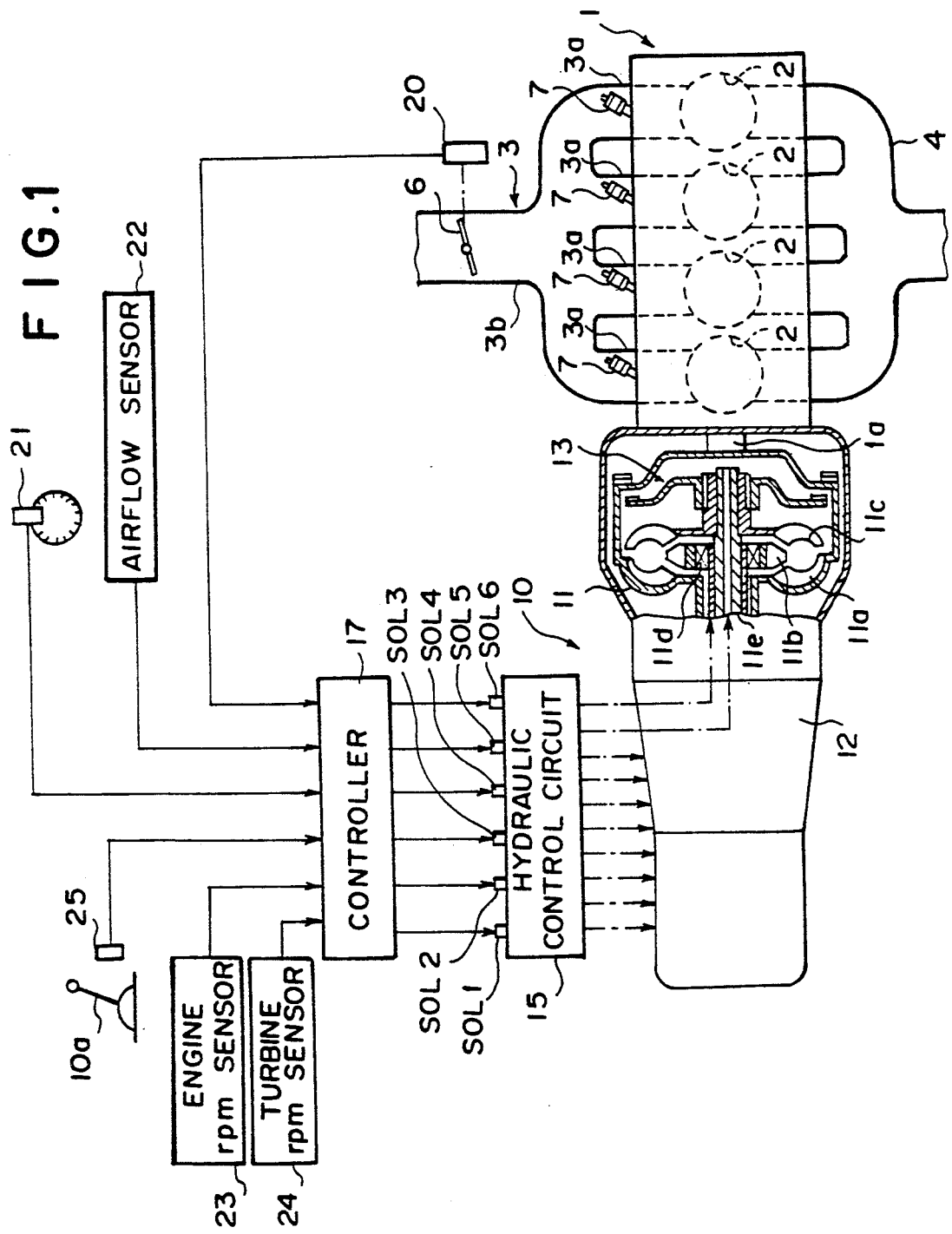
FIG. 1 is a schematic view of a vehicle provided with a control system in accordance with an embodiment of the present invention.

In FIG. 1, an engine 1 has four cylinders 2, an intake passage 3 and an exhaust passage 4. The intake passage 3 has discrete intake passage portions 3a which communicate with the respective cylinders 2 and a common intake passage portion 3b which is connected to the upstream ends of the discrete intake passage portions 3a at one end and opens to the atmosphere at the other end. A throttle valve 6 is provided in the common intake passage portions 3b, and a fuel injection valve 7 is provided in each discrete intake passage portions 3a.

An automatic transmission 10 comprises a torque converter 11 connected to an output shaft 1a of the engine 1 and a transmission gear mechanism 12 which may have four forward speeds and one reverse, for instance. The torque converter 11 comprises a pump 11a connected to the output shaft 1a of the engine, a stator 11b, a turbine 11c and one-way clutch 11d which prevents the stator 11b from rotating in the direction opposite to the turbine 11c. The turbine 11c is connected to the transmission gear mechanism 12 by way of a converter output shaft 11e.

A lockup mechanism 13 engages and disengages to directly connect and disconnect the engine output shaft 1a (that is, the input shaft of the torque converter 1) to and from the converter output shaft 11e.

A hydraulic control circuit 15 controls the transmission gear mechanism 12 and the lockup mechanism 3, and has five solenoid valves SOL1 to SOL5 for controlling the friction coupling elements in the transmission gear mechanism 12 and a duty solenoid valve SOL6 for controlling the lockup mechanism 13.

A controller 17 controls the solenoid valves SOL1 to SOL6, and detecting signals of a throttle opening sensor 20 which detects the opening degree of the throttle valve 6, a vehicle speed sensor 21 which detects the speed of the vehicle, an airflow sensor 22 which detects the amount of intake air, an engine speed sensor 23 which detects the engine speed, a turbine speed sensor 24 which detects the rotational speed of the turbine 11c of the torque converter 11 and a selector lever position sensor 25 which detects the position of a selector lever 10a of the automatic transmission 10 are input into the controller 17.

The controller 17 causes the fuel injection valves 7 to inject fuel in an amount determined according to the amount of intake air, and cuts fuel injected from the injection valves 7 when it is determined according to the throttle opening and the engine speed that the engine 1 is decelerating. Further, the controller 17 controls the solenoid valve SOL6 to cause the lockup mechanism 13 to completely engage and disengage and to engage with a controlled engaging force which permits the turbine output shaft 11e to rotate at a speed different from the speed of the engine output shaft 1a, the difference in rotational speed between the turbine output shaft 11e and the engine output shaft 1a being limited. The engagement of the lockup mechanism 13 with such a controlled engaging force will be referred to as "slipping engagement", and the control which causes the lockup mechanism 13 to engage in slipping engagement will be referred to as "slip control" in this specification. In the slip control, the controller 17 controls the lockup mechanism 13 by way of duty control of the solenoid valve SOL6 so that the difference in rotational speed between the turbine output shaft 11e and the engine output shaft 1a converges on a target value.

The slip control of the lockup mechanism 13 will be described with reference to FIG. 2, hereinbelow.

Figure 2:
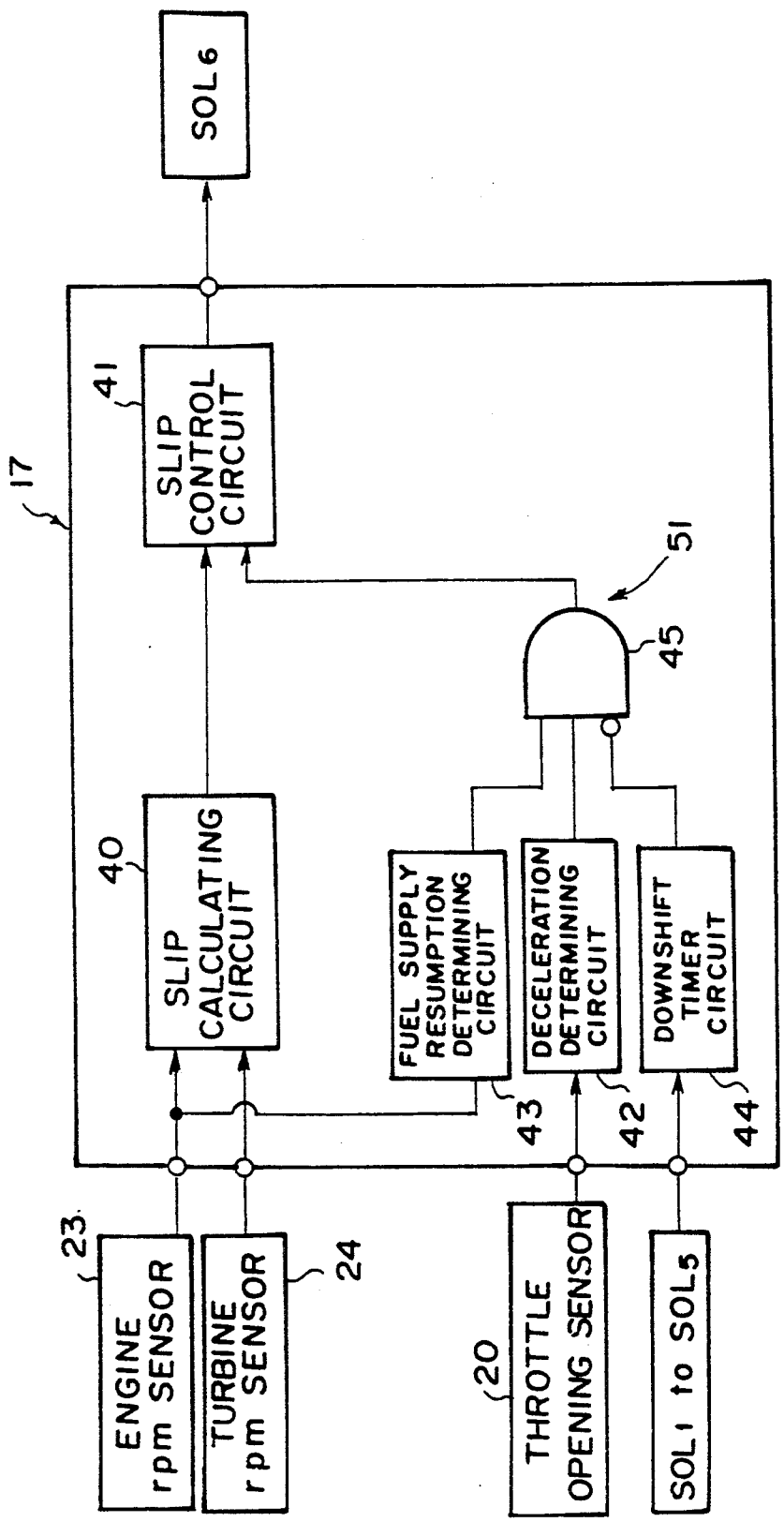
FIG. 2 is a block diagram of the controller.

In FIG. 2, reference numeral 40 denotes a slip calculating circuit which receives the outputs of the engine speed sensor 23 and the turbine speed sensor 24 and calculates the difference between the engine speed and the turbine speed. Reference numeral 41 denotes a slip control circuit which controls the duty of the solenoid valve SOL6 so that the slip of the difference between the engine speed and the turbine speed as calculated by the slip calculating circuit 40 converges on a target value. Reference numeral 42 denotes a deceleration determining circuit which determines, based on the throttle opening as detected by the throttle opening sensor 20, whether the engine 1 is decelerating and outputs a deceleration signal at "1" level when it determines that the engine 1 is decelerating. Reference numeral 43 denotes a fuel supply resumption determining circuit which outputs a fuel supply resumption signal at "1" level when the engine speed Ne as detected by the engine speed sensor 23 falls below a preset engine speed Nr. Reference numeral 44 denotes a downshift timer circuit which receives a downshift signal representing that a downshift begins to take place from the solenoid valves SOL1 to SOL5 for controlling the friction coupling elements in the transmission gear mechanism 12 and begins to measure time in response to receipt of the signal and continues to output a signal at "1" level for a preset time interval TM after the beginning of the downshift. Reference numeral 45 denotes an AND circuit into the outputs of the deceleration determining circuit 42 and the fuel resumption determining circuit 43 and the inverted output of the downshift timer circuit 44. The output of the AND circuit 45 is input into the slip control circuit 41. The output at "1" level of the AND circuit 45 is input into the slip control circuit 41 as a slip inhibiting signal. Though not shown, the controller 17 is further provided with a circuit which inhibits operation of the slip control circuit 41 when the operating condition of the engine is in a predetermined range such as a heavy load range.

The deceleration determining circuit 42 and the fuel supply resumption determining circuit 43 together form a deceleration detecting means 50 which determines that the engine 1 is decelerating when the throttle valve opening is minimum and the engine speed Ne is higher than the preset engine speed Nr. The AND circuit 45 and the slip control circuit 41 together form a lockup mechanism control means 51. The lockup mechanism control means 51 causes the slip control circuit 41 to control the engaging force of the lockup mechanism 13 when the engine 1 is decelerating since the fuel supply resumption signal is not output though the deceleration signal is output and accordingly the AND circuit 45 does not output the slip inhibiting signal. When the engine speed Ne subsequently falls below the preset engine speed Nr and the deceleration finishes, the lockup mechanism control means 51 outputs the slip inhibiting signal so long as the output of the downshift timer circuit 44 is at "0" level, i.e., the inverted output is at "1" level, since the output of fuel supply resumption determining circuit 43 turns to "1" level.

That is, so long as the output of the downshift timer circuit 44 is at "1" level, the AND circuit 45 cannot output the slip inhibiting signal. In other words, until the predetermined time interval TM lapses after beginning of downshift, the lockup mechanism 13 cannot disengage.

Figure 3:
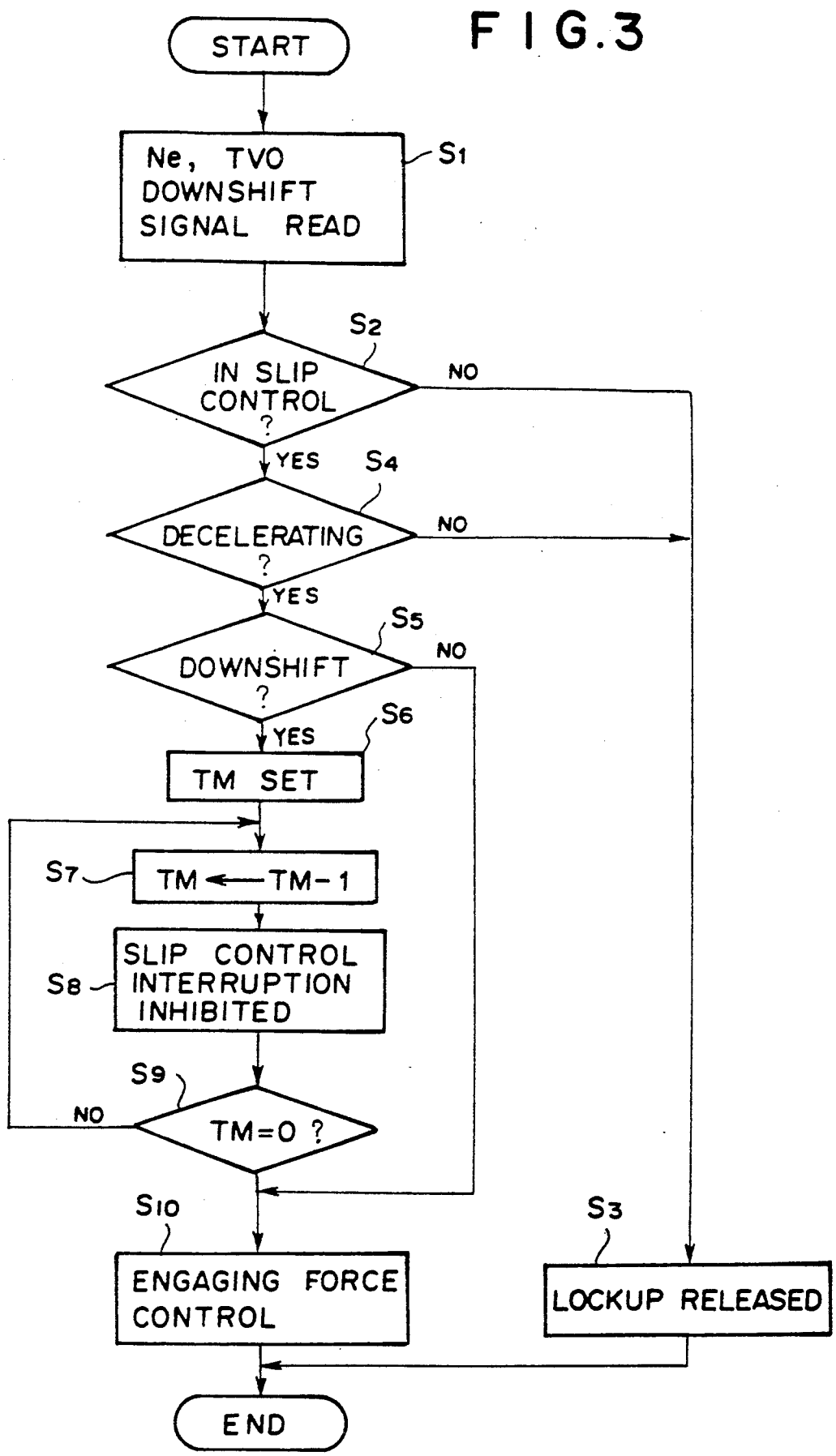
FIG. 3 is a flow chart illustrating the control of the engaging force of the lockup mechanism during deceleration.

The operation of the controller 17 will be described with reference to the flow chart shown in FIG. 3, hereinbelow.

The controller 17 first reads the engine speed Ne, the throttle opening TVO and the downshift signal (step S1). Thereafter, the controller 17 determines in step S2 whether the slip control is now being effected. When it is determined in step S2 that the slip control is not being effected, the controller 17 causes the lockup mechanism 13 to disengage (step S3).

Otherwise, the controller 17 determines in step S4 whether the engine 1 is being decelerated. When it is determined that the engine 1 is not being decelerated, the controller 17 proceeds to step S3 and causes the lockup mechanism 13 to disengage. Otherwise the controller 17 determines in step S5 whether the automatic transmission 10 began downshifting. When it is determined that the automatic transmission 10 did not begin downshifting, the controller 17 directly proceeds to step S10 and controls the lockup mechanism 13 by way of duty control of the solenoid valve SOL6 so that there is a difference in the rotational speed of the input shaft 1a and the output shaft 11e of the torque converter 11

On the other hand, when it is determined in step S5 that the automatic transmission 10 began downshifting, the controller 17 sets the preset time interval TM for the downshift timer and inhibits interruption of the slip control, i.e., inhibits the lockup mechanism 13 from disengaging, until the preset time interval TM lapses after the beginning of the downshift (steps S6 to S9). Such is the case even if the engine speed Ne temporarily falls below the preset engine speed Nr while the automatic transmission is in neutral midway of the downshift. When the preset time interval Tm lapses, the controller 17 proceeds to step S10 and controls the lockup mechanism 13 by way of duty control of the solenoid valve SOL6 there is difference in the rotational speed of the input shaft 1a and the output shaft 11e of the torque converter 11.

Figure 4:
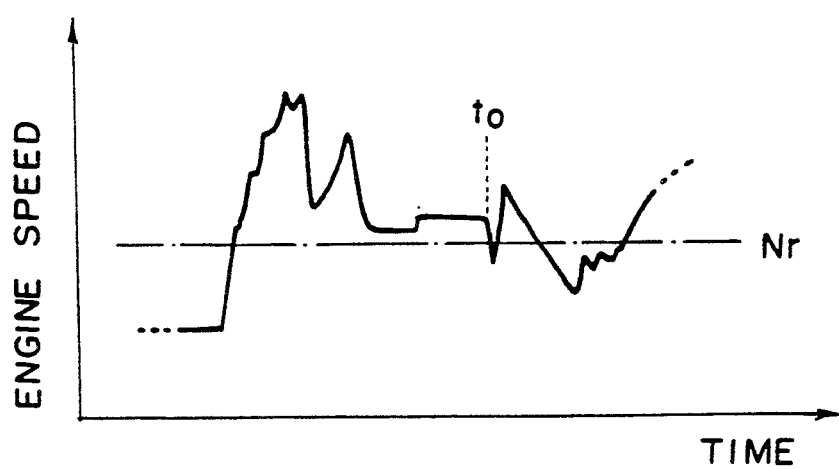
FIG. 4 is a view for illustrating the operation of the control system of the embodiment.

Assuming that the engine provided with the control system of this embodiment repeats acceleration and deceleration in fourth gear as shown in FIG. 4, fuel injected from the fuel injection valves 7 is cut during deceleration of the engine and at the same time the engaging force of the lockup mechanism 13 is controlled. Accordingly, the driving force is transmitted to the engine 1 from the driving wheels and engine brake effect can be obtained, whereby the fuel economy and the deceleration performance are improved.

If the automatic transmission 10 downshifts from fourth to third at time $t_o$ shown in FIG. 4, the engine speed Ne can abruptly fall below the preset engine speed Nr while the automatic transmission 10 is in neutral. In this case, though the fuel supply resumption determining circuit 43 outputs the fuel supply resumption signal, the AND circuit 45 cannot output the slip inhibiting signal so long as the output of the downshift timer circuit 44 is at "1" level or until the preset time interval TM lapses after the beginning of the downshift as described above. Thus, fuel cut can be continued without being misled by temporary fall in the engine speed due to downshift of the automatic transmission, whereby the fuel economy and the deceleration performance are further improved.

Though, in the embodiment described above, the lockup mechanism 13 is inhibited from disengaging for predetermined time interval TM after the beginning of downshift, the lockup mechanism 13 may be inhibited from disengaging while the automatic transmission 10 is in neutral in the process of the downshift as shown in FIG. 5. The FIG. 5 arrangement is similar to that of FIG. 3, with steps S11-S15, S17 and S18 corresponding to steps S1-S5, S8 and S10 respectively. However, in FIG. 5, a sensor or other suitable means is utilized for detecting the neutral condition. When a neutral determination is made at step S16, the lockup is inhibited from disengaging. Note that while the FIG. 5 arrangement is an alternative to that of FIG. 3, it may also be possible to utilize the FIG. 5 arrangement in addition to that of FIG. 3. For example, the lockup could be inhibited over a predetermined time interval, with a neutral sensor (as a backup) indicating that the lockup should continue to be inhibited from disengaging even after the predetermined time interval has elapsed when the neutral condition is sensed.

Further, though, in the embodiment described above, the present invention is applied to an automatic transmission having a lockup mechanism in which the lockup mechanism is caused to engage in slipping engagement while the engine is decelerating, the present invention may be applied to an automatic transmission in which the lockup mechanism is caused to engage so that the driving force is transmitted solely through the lockup mechanism.

We claim:

1. A control system for a vehicle provided with an engine and an automatic transmission having a lockup mechanism which engages and disengages to directly connect and disconnect input and output shafts of a torque converter of the automatic transmission to and from each other, the control system comprising a deceleration detecting means which detects that the engine is decelerating based on an engine speed of the engine as detected by an engine speed sensor and a throttle opening as detected by a throttle opening sensor, and a lockup mechanism control means which causes the lockup mechanism to engage when the engine is decelerating and permits the same to disengage when the deceleration of the engine finishes, wherein the improvement comprises:

a downshift detecting means which detects that a downshift of the automatic transmission begins to take place, and a lockup release inhibiting means which receives an output of the downshift detecting means and inhibits the lockup mechanism control means from causing the lockup mechanism to disengage in a period in which the engine speed can temporarily fall because of the automatic transmission's shifting into neutral in a process of a downshift detected by the downshift detecting means.

2. A control system as defined in claim 1 in which said lockup release inhibiting means inhibits the lockup mechanism control means from causing the lockup mechanism to disengage for a preset time interval after a beginning of a downshift.

3. A control system as defined in claim 1 which further comprises a neutral detecting means which detects that said automatic transmission is in neutral and in which said lockup release inhibiting means inhibits the lockup mechanism control means from causing the lockup mechanism to disengage while the neutral detecting means detects that the automatic transmission is in neutral in the process of the downshift detected by the downshift detecting means.

4. A control system as defined in claim 1 in which said lockup mechanism control means causes the lockup mechanism to engage in slipping engagement while the engine is decelerating.

* * * * *